United States Patent [19]

Gilliland, III

[11] Patent Number: 4,747,648
[45] Date of Patent: May 31, 1988

[54] OPTICAL FIBER DISPLAY AND OPTICAL TRAIN FOR SAME

[75] Inventor: B. David Gilliland, III, Memphis, Tenn.

[73] Assignee: DRD Ltd., Memphis, Tenn.

[21] Appl. No.: 694,335

[22] Filed: Jan. 24, 1985

[51] Int. Cl.$^4$ .............................. G02B 6/00; F21V 7/04; H01J 5/16; G09F 21/04

[52] U.S. Cl. ............................... 350/96.10; 350/96.24; 350/96.25; 350/269; 362/32; 250/227; 40/463; 40/464; 40/547

[58] Field of Search ............... 350/96.10, 96.28, 96.20, 350/96.26, 96.24, 269, 96.25, 96.27; 250/227; 362/32; 40/426, 427, 442, 448, 463, 464, 466, 547

[56] References Cited

U.S. PATENT DOCUMENTS

| | | | |
|---|---|---|---|
| 2,263,281 | 11/1941 | Von Tadden | 40/547 X |
| 2,354,367 | 7/1944 | Ford | 40/547 X |
| 3,600,058 | 8/1971 | Kato | 350/96.10 X |
| 3,601,914 | 8/1971 | Fuller, Jr. | 350/269 X |
| 3,715,822 | 2/1973 | Hansen, Jr. et al. | 350/96.10 X |
| 3,763,586 | 10/1973 | Western | 350/96.10 X |
| 3,786,500 | 1/1974 | Fiorletta et al. | 250/227 X |
| 3,836,911 | 9/1974 | Gibson et al. | 350/96.10 X |
| 3,889,196 | 6/1975 | Gibson et al. | 250/227 X |
| 3,948,209 | 4/1976 | Takemoto et al. | 40/547 X |
| 3,962,702 | 6/1976 | Kriege | 350/96.10 |
| 4,082,435 | 4/1978 | Zeitz | 350/269 |
| 4,113,347 | 9/1978 | Gaertner | 350/96.24 |
| 4,299,447 | 11/1981 | Soltan et al. | 350/96.25 |
| 4,486,760 | 12/1984 | Funada et al. | 350/96.27 |
| 4,601,537 | 7/1986 | Saccocio | 350/96.27 |
| 4,650,280 | 3/1987 | Sedlmayr | 350/96.27 |

FOREIGN PATENT DOCUMENTS

| | | | |
|---|---|---|---|
| 56-83705 | 7/1981 | Japan | 350/96.24 |
| 56-117217 | 9/1981 | Japan | 350/96.24 |
| 2051447A | 1/1981 | United Kingdom | 350/96.25 X |
| 2073930 | 10/1981 | United Kingdom | 362/32 X |

Primary Examiner—William L. Sikes
Assistant Examiner—Brian M. Healy
Attorney, Agent, or Firm—Willian Brinks Olds Hofer Gilson & Lione Ltd.

[57] ABSTRACT

A modularized optical fiber display system is disclosed wherein each module has an optical train including a plurality of optical fibers or cables organized at one end into a bundle which is illuminated by a lamp, with each of the optical fibers of the bundle having an individual, independently controlled shuttering mechanism associated with it for controlling light flow from each optical fiber to respective lenses forming pixels in a signboard display. Each of the pixels is individually controlled to enable production of any desired alpha-numeric character or other graphic on the signboard. Each of the display modules can be separately used, or integrated into a single large display.

5 Claims, 1 Drawing Sheet

OPTICAL FIBER DISPLAY AND OPTICAL TRAIN FOR SAME

FIELD OF THE INVENTION

This invention generally relates to optical fiber display devices and systems for displaying letters, numerals, or other graphics, such as in an advertising display, and more particularly relates to a modularized optical fiber display system wherein each module has an optical train including a plurality of optical fibers or cables organized at one end into a bundle which is illuminated by a lamp, with each of the optical fibers of the bundle having an individual independently controlled shuttering mechanism associated with it for controlling light flow from the optical fibers to respective lenses forming pixels in a signboard display.

BACKGROUND OF THE INVENTION

Illuminated displays, such as for advertising, scorekeeping and other message and signal indication are well known. Such illuminated displays have been found very effective in attracting and maintaining the attention of an observer and delivering a message or other information. Conventional illuminated displays usually consist of a plurality of incandescent lamps in the form of separate light bulbs, which are mounted in a matrix arrangement on a display board. Each bulb forms a particular pixel in the illuminated display. An optical control system is used which causes the bulbs to be individually energized and de-energized in a predetermined manner to simulate alpha-numeric characters or other graphics.

One of the principal disadvantages in such displays which use a separate incandescent lamp for each of the pixels is the considerable number of lamps required, along with a very sizable power requirement to produce an illuminated display of sufficient intensity for legibility at a distance. Such displays using incandescent lamps have further proven to be expensive to operate and maintain, and also do not perform well either in a continuous or in a pulsed application. This is because the filament of the lamp requires time to heat-up to incandescence when turned on as well as to cool down after being turned off. There is also a possibility that, as a consequence of lamp failure, the signal desired to be indicated will be misinterpreted or garbled.

Light-transmitting fibers or cables have also been used in illuminated displays. For example, it is known to illuminate lenses arranged in a display matrix through the use of light conducting optical fibers. The elongated optical fibers are typically arranged at one end into a light conductor bundle with the bundled ends of the optical fibers illuminated by a lamp. The other end of each cable terminates in a lens of the display. When the bundle is illuminated, the lenses associated with that bundle are also illuminated. Such optical fiber systems are shown in U.S. Pat. No. 4,113,347, and U.K. Pat. No. 2,051,447.

These optical fiber display systems of the prior art ordinarily use a separate bundle which is illuminated by its own incandescent lamp to form a particular character or other graphic on the display. That is, a separate bundle and lamp is required for each character or graphic desired.

One drawback of such a system is that the number of characters which can be generated is limited due to the increase in the number of bundles and lamps required for each additional character. There is also some difficulty in efficiently attaching the numerous ends of the optical fibers making up each of the individual bundles to the lenses of the display face. That is, a single lens in the display may have a plurality of optical fibers connected to it. Some of these fibers will be located off-axis on the lens, which can reduce the intensity of the light from the lens. The power consumption of each of the lamps used to illuminate the bundles, while less than that of a display using incandescent lamps as the pixels, is still sizable.

It will be noted in U.S. Pat. No. 3,962,702 at FIG. 5 that a mechanism is shown whereby adjacent bundle ends may be shuttered and illuminated by a single lamp. This may reduce the number of lamps required, but still has the significant disadvantage of requiring a separate bundle for each of the characters to be shown in the display. Many lamps would still be required in order to provide adequate illumination for a large number of bundles with the type of shutter arrangement indicated in the '702 patent.

An alternative to the use of separate bundles of optical fibers for each of the characters to be displayed is the use of a plurality of prearranged groups of optical fibers which can be illuminated in certain combinations to make each alphanumeric character. This is done through the use of an apertured light mask interposed between a lamp and the groups of fiber ends. Such systems are shown in U.S. Pat. Nos. 3,836,991 and 3,948,209, for example. In these systems, the mask registers specific apertures with selected groups of fibers to thereby produce a particular character on the display face. Although a single source of illumination can be used in this system, the types of characters that can be made are limited by the number of fiber groups as well as the apertures provided in the mask. Use of a rotary mask further requires considerable time in moving from one alphanumeric character to another, whether done manually or through a mechanical drive.

A problem to be solved by any optical fiber display is that of providing sufficient light intensity for the pixels of the illuminated display, particularly a large outdoor display which is to be seen from a distance in daylight, such as in roadside sign applications, athletic stadium scoreboards, etc. Part of that illumination problem is to enable the display to be read from a broad range of viewable angles, and not just from a head-on approach.

For the most part, these light intensity considerations coupled with the limited character generating ability and slow character-change response time of existing optical fiber illumination mechanisms have particularly inhibited the construction of fairly large optical fiber displays which can be seen at long distances.

SUMMARY OF THE INVENTION

One objective of this invention is to form an optical fiber display device wherein each of the light channels represented by the separate optic fibers or cables making up the display matrix is individually controlled to enable production of any desired alpha-numeric character or other graphic. In conjunction with this objective is the provision of a very rapid shuttering mechanism for each of the light channels to produce moving graphics and video displays, for example.

A further objective of this invention is the provision of an optical train which utilizes a single light source to illuminate all the bundled ends of the optic fibers making up a discrete display matrix, and which yields a high resolution output for the display.

Yet another objective is to provide a modularized display system comprised of discrete display matrices of the foregoing type, each of which can be used separately or integrated into a single large display.

These objectives have been accomplished in this invention in an optical fiber display device which provides selective control over the light output from each one of a plurality of light conductors of a discrete display matrix. More specifically, the display is made up of a matrix of expansion lenses arranged into columns and rows, with each lens receiving light from a terminal end of an individual light conductor, i.e., an optic fiber or cable. The light output from each of the individual light conductors is separately controlled to thereby enable illumination of any of the lenses in any sequence or combination to create displays of any desired type. In its preferred form, light passing through each of the light channels represented by a single light conductor is controlled by a high speed shutter, with all the shutters being connected to a controller for operating the shutters according to a pre-arranged program.

The individual optical fibers of a discrete display matrix are organized into a single bundle at one end which is illuminated by a source of light, such as a single high intensity lamp. The optic train used herein is designed to maximize light transfer through each light channel for improved light intensity which enables the incorporation of more light conductors in the display and improves the resolution of the display, particularly at long distances. To this end, a particular connection is used between an optical fiber and its associated lens which ensures maximum light transference to the lens.

Each of the discrete display matrices is also designed as a compact self-contained unit which can be used as a display all by itself, or can be integrated into a much larger display. A modularized display device is thus provided whereby any number of discrete display matrices can be readily organized into an integrated whole which is operated from a common or master controller. Very large displays such as for roadside signs, athletic scoreboards, etc. can be made using this modularized display system.

The present invention thus provides an optical fiber display device which enables the creation of any alpha-numerical character or other graphic on the display as desired through the control of light from each of the individual light conductors making up the pixels of the display. Each display matrix is compact in form, and utilizes only a single source of illumination which greatly reduces its power consumption. The optical train employed also enhances the resolution of the display. Further, a large number of discrete display matrices can be organized into a much larger display.

The features and advantages of the present invention will be more readily understood upon consideration of the following detailed description of the invention taken in conjunction with the accompanying drawings, in which:

DETAILED DESCRIPTION OF THE INVENTION

This invention has been particularly adapted for use in a signboard-type display such as would be used in a large outdoor display. For example, the embodiment of the invention described hereinafter would find particular utility as a marquee for a theater, hotel, restaurant, service station, etc. for viewing by passersby. The display may be one of a continuous nature, such as displaying the price of gasoline, or more advantageously of a changing nature where a fairly long message is being conveyed in a moving fashion. It will, of course, be understood that the invention is readily adaptable to any kind of display situation, whether indoors or outdoors, and can be scaled in size according to the specific application. In particular, the present invention can be formed into a very large display, such as might be used in convention centers, sports arenas and the like.

Figure 1:
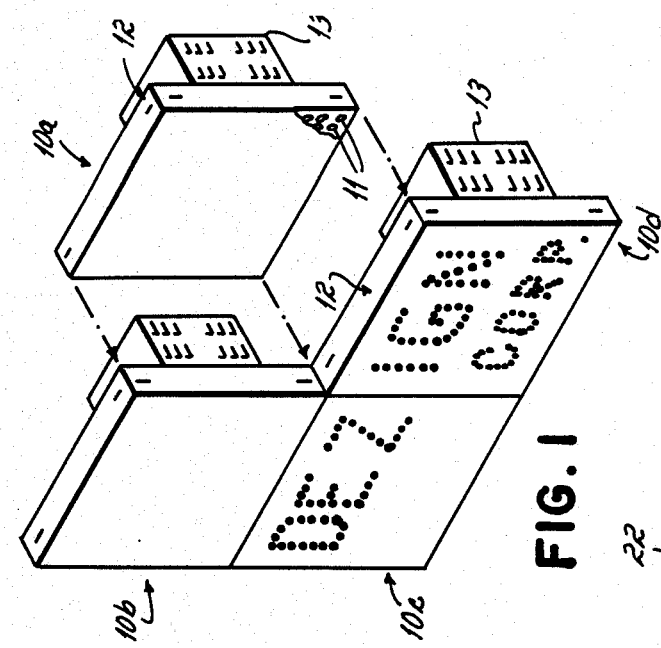
FIG. 1 is a diagrammatic perspective view of a number of individual optical fiber display modules organized into a single display.

With reference to FIG. 1, a large display is shown formed from the integration of self-contained discrete display matrices organized into modules 10a–10d. Use of the terminology "discrete matrices" refers to the fact that each of the display modules 10a–10d has an individual matrix of pixels in the form of rows and columns of diffusion or expansion lenses 11 which are connected to an optical train and illumination mechanism that controls the illumination of that particular matrix (as will be described in further detail hereinafter). A present embodiment of the invention uses a matrix composed of 24 rows of regularly spaced lenses 11 arranged in 24 columns for a total of 576 lenses.

Each of the display modules 10a–10d has a casing 12 with a roughly square face which can be varied in size with the size and number of the lenses 11 used. A display face of about 5' by 5' is considered to be a particularly useful size. Each of the modules 10a–10d has a depth of about 20" in the illustrated embodiment. A housing 13 attached to the backwall of the casing 12 contains most of the operating components, including environmental controls (i.e., a fan), much of the optical train, and the logic and drive circuitry used to control illumination of the display matrix.

Each of the discrete display modules 10a–10d can be individually used to form a single display, or can be organized into a larger display by physically associating each of the modules together to form a unified display of the desired size. For example, each casing 12 connects to another casing through tongue and groove connectors formed along the lateral sides of each casing, with additional securement through the use of common latch fasteners. Any number of modules 10a–10d can be joined in side-to-side fashion to make a unified display face of any length and height. It will be noted that the controllers for each of the individual modules are connected to a main or master controller which coordinates the operation of all of the modules 10a–10d into an integrated display device.

Figure 2:
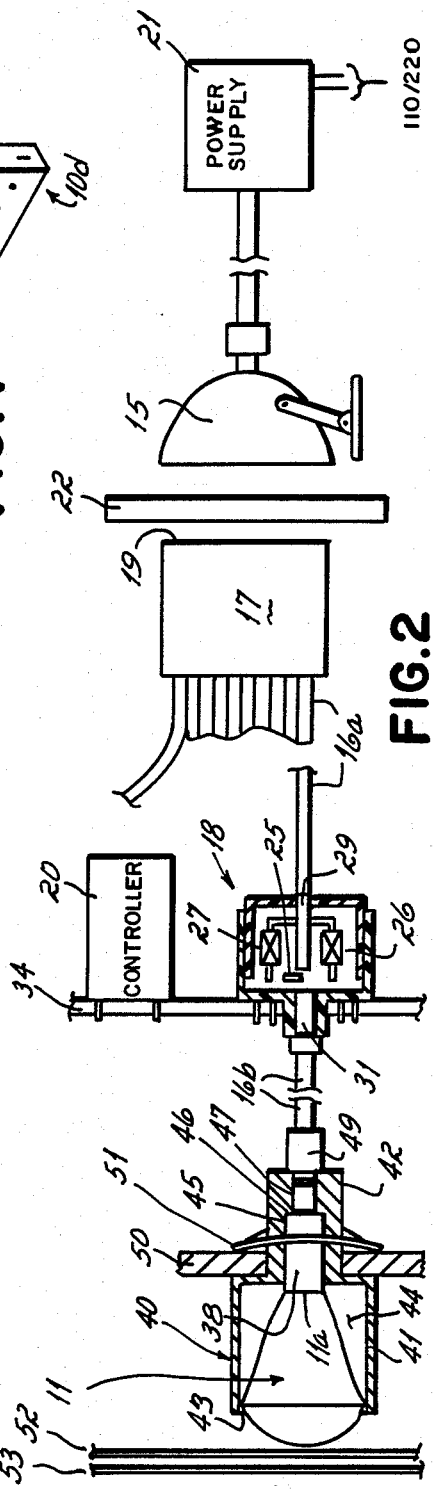
FIG. 2 is a diagrammatic illustration of an embodiment of an optical train made in accordance with the principles of this invention.

This compact modularized display system is largely made possible through the use of the novel optical train illustrated in FIG. 2. This optical train is basically comprised of a high intensity light source 15 which illuminates a plurality of optic fibers or cables 16a collected into a bundle by a harness 17. A shuttering mechanism 18 serves to control transmission of light from light fiber 16a to a light fiber 16b which terminates in a lens complex including the expansion lens 11. A controller 20 in each of the modules 10a–10d serves to control and coordinate the operation of each of the shutter mechanisms 18. An optical fiber 16a, its associated optical fiber 16b, and the light transmitting components of the associated lens complex (to be described in further detail hereinafter) all comprise a single light conductor, as referred to herein.

More specifically, each of the display modules 10a–10d has a light source 15, such as a high intensity tungsten-halogen lamp with associated reflector. One such lamp is a MR16 Sylvania lamp (with reflector) having a 12 volt, 110 watt rating. Such a high intensity lamp is desirable because it is very bright, and very long lived. In this regard, a plasma arc lamp, or HID lamp can be used to further advantage as the light source. A power supply 21 is provided for operation of the lamp 15, such as a class B step-down transformer operated off a suitable current supply. Controller 20 operates on its own power supply, such as a conventional dual voltage harmonic resonant linear power supply which provides a drive voltage to the shutter mechanism 18 at around 12 v, and around 5 volts for operating the shutter control logic circuitry.

Light conductors in the form of optical fibers 16a, 16b are standard optical wave guide fibers made of glass, or clear plastic such as Lucite or Plexiglas which are highly transparent. Loss of light from the fiber cables is minimized by providing a high refractive index for the fibers relative to the surrounding medium. Air may be sufficient, or a layer of transparent cladding material formed on the surface of the individual fibers can be used. It will be noted that "optical fiber" as used herein refers to both a single monofilament as well as a plurality of optical fiber strands which are arranged into a cable which then serves as a single optical channel.

The ends of the optical fibers 16a are grouped into a bundle and fixed in the harness 17 which supports the fibers so that the end faces thereof are properly positioned with respect to the lamp 15. All of the bundled fiber ends are preferably made coplanar, with this end surface 19 then polished.

A transparent pane of heat control glass 22 is interposed between the high intensity light source 15 and the bundle end surface 19. It will be noted that the end surface 19 is located to intercept nearly all of the cone-shaped pattern of light issuing from the lamp 15 for maximum illumination of the fiber ends. The fibers 16a are also randomized within the harness 17 to keep the intensity of the display roughly homogeneous across the entire display face.

Each of the optical fibers 16a terminates in a separate shutter mechanism 18 having a shutter blade 25. The particular shutter mechanism used herein is a very high speed shutter mechanism which is the subject of a co-pending patent application filed on the same date herewith which is a continuation-in-part of U.S. Ser. No. 545,658, filed Oct. 26, 1983, now abandoned, the disclosure of which c.i.p. is hereby incorporated by reference as if specifically set forth herein. The shutter mechanism 18 moves shutter blade 25 through operation of electromagnets 26 and 27 to block, unblock or partially block the optic channel. That is, the shutter mechanism 18 controls the passage of light from optic fiber 16a to optic fiber 16b, the latter also having one end terminating in the shutter mechanism 18.

Figure 3:
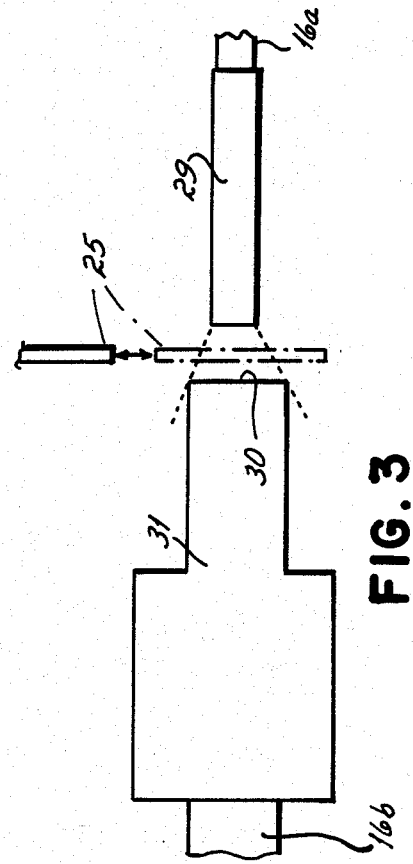
FIG. 3 is a diagrammatic illustration of the optical train of FIG. 2 in the vicinity of the shutter mechanism.

The arrangement of the adjacent ends of optic fibers 16a and 16b within the shutter mechanism is particularly shown in FIG. 3. This arrangement is designed to maximize the transmission of light from optic fiber 16a to optic fiber 16b. To this end, an optic fiber 16a having a diameter of 0.06" is fixed within an input ferrule 29 formed in the casing of the shutter mechanism 18. The optic fiber 16a has a numerical aperture of about 0.56, which is related to the angle of trajectory or exit angle of the light beam as it exits the fiber end, and is therefore related to the beam spread. There is a gap of about 1/16 of an inch between the end of the optic fiber 16a and the end of optical fiber 16b which fills an aperture 30 formed in an output ferrule 31 in which optical fiber 16b is received. Output ferrule 31 is also formed in the casing of the shutter mechanism. The shutter blade 25 moves within this 1/16" gap to effect shuttering of the light channel by covering, uncovering or partially covering this aperture 30 (i.e., the end of optical fiber 16b).

The optic fiber 16b has a diameter of about 0.1", with a numerical aperture of about 0.66. The increase in the diameter of fiber 16b, as well as the increase of its numerical aperture, enhances the efficiency of light transfer from fiber 16a to fiber 16b to reduce loss of light intensity from beam spread between the two fibers 16a, 16b. That is, the end of optical fiber 16b is located to intercept substantially all of the cone of light emanating from optical fiber 16a. Input and output ferrules 29, 31 are axially aligned to provide for proper arrangement of the two optical fiber ends upon assembly of the optical train.

Each of the shutter mechanisms 18 is mounted in a printed circuitboard 34 (p.c. board) which has suitable electrical connections for each of the electromagnets 26, 27 of each of the shutter mechanisms 18 to interconnect the shutter mechanism to the controller 20. It may be noted that a multi-plex scanning arrangement using pulse circuitry and microprocessor technology can be used to particular advantage with this system.

Each of the optical fibers 16b terminates in a lens complex which includes a lens 11, a matching or blending rod 38 which interconnects the end of the optic fiber 16b to the lens 11, and a mount 40 for the lens, matching rod and optic fiber 16b. The lens 11 used herein is a compound parabolic concentrator type lens as shown in U.S. Pat. No. 4,240,692. A 2" (maximum diameter) lens is used herein having a base 11a with a width of about 7/16". It has a principal viewing angle of about 45° (22.5° half-angle). This fairly wide viewing angle for the lens increases the visibility of the display.

The matching rod 38 is used to permit sufficient spreading of the beam exiting from the 0.1" diameter optical fiber 16b to just cover the entire diameter of the base 11a for the most efficient transfer and diffusion of light in the lens 11. As previously noted, the optical fiber 16b has a numerical aperture of about 0.66 for light exiting the fiber. A matching rod 38 having a length of about ⅜" and a diameter of 5/16" is thus used to fill the gap between the end of optical fiber 16b and the base 11a of the lens. While an air gap could be used for this beam spread between optical fiber 16b and the lens 11, the use of a light conducting matching rod 38 improves light transfer to the lens. The lens 11 and the matching rod 38 are both made out of the same material, such as acrylic or glass, with acrylic being preferred from a production and cost standpoint.

The end of the matching rod 38 is also modified at the interface between the matching rod and the lens 11 to effect smearing of the light over the entire base 11a of the lens to scatter the light for more even diffusion. This smearing can be accomplished by frosting the end of the matching rod by chemical etching, applying a light scattering material, by cross-hatching or mechanically abrading the rod end, or by forming the light scattering surface in a molding process.

The lens 11, matching rod 38 and terminal end of the optic fiber 16b are all held in position by the lens mount 40. The lens mount 40 has a lens socket 41 in which the lens 11 is received. Lens 11 is held in place by an inwardly extending bead 43 which presses the lens against five ribs 44 which are located about the base of the socket 41. Each of the ribs 44 is tapered to the shape of the lens 11 in the area of its base 11a, and engages the lens in sharp edge contact.

The matching rod 38 is received in a bore 45 formed in a reduced diameter portion 42 of the lens mount. The matching rod bears at one end against a shoulder 46 formed at the base of the bore 45. The length of the bore 45 is so sized that the end of the matching rod 38 and the lens base 11a are pressed together in tight engagement. An optical jelly is used to make this interface airtight.

A second bore 47 extends between the end of the reduced portion 42 and the bore 45 in which the matching rod 38 is located. This second bore 47 receives ferrule 49 surrounding the output end of the optic fiber 16b. It will be noted that the bores 45, 47 and the socket 41 are coaxial so that the output end of optic fiber 16b, the matching rod 38 and lens 11 are likewise coaxially aligned.

The lens mount 40 is received in a suitable aperture in a mounting or display panel 50. A tinnerman type clip 51 is used to hold the mount 40 in place on the panel 50. As previously mentioned, a mounting board 50 making up one of the optical fiber display modules 10a–10d has approximately 576 of these lenses 11 mounted in a matrix of 24 rows by 24 columns, with each of the lenses functioning as a separate pixel in the display. The display face itself is completed by a polycarbonate face plate 52, and a bronze sun screen 53 which is used to keep glare off the face plate 52.

In operation of a large display, a plurality of display modules 10a–10d are connected together in side-by-side arrangement along adjacent casing 12 sides. The controllers 20 of each of the modules are connected to a master controller in a master-slave arrangement to thereby integrate the operation of the modules into a single large unified display. Each lamp 15 of the separate modules 10a–10d is activated to illuminate a respective optical fiber bundle end surface 19. The shutters 18 of the individual light conductors are then driven according to a pre-arranged program incorporated in the master controller to selectively and independently illuminate each of the lenses/pixels to produce the desired display. The display can be of any type or content, and a video-type moving display is considered to be within the capabilities of this device.

Thus, while the invention has been described in connection with a certain embodiment, those skilled in the art will recognize modifications of structure, arrangement, portions, elements, materials and components which can be used in the practice of the invention without departing from the principles of this invention.

What is claimed is:

1. An optical fiber display device comprising:
   a display surface,
   a plurality of pixels formed on said display surface,
   a plurality of light conductors, each light conductor having a light input end and a light output end, said light input ends being grouped together, each said light output end terminating in said display surface in a pixel,
   a source of light for illuminating said grouped output ends to thereby illuminate said pixels,
   a plurality of shutter means for controlling light flow through said light conductors, each shutter means being associated with a respective light conductor for individual control of the illumination of each said pixel,
   each of said light conductors being comprised of a first optical fiber having two ends, one end of said first optical fiber forming said light input end, the other end of said first optical fiber terminating in a respective shutter means, a second optical fiber having two ends, one end of said second optical fiber having two ends, one end of said second optical fiber terminating at said display surface in a pixel, the other end of said second optical fiber terminating in said respective shutter means, said ends of said first and second optical fibers terminating in said respective shutter means being aligned in spaced apart relationship to conduct light from said first optical fiber to said second optical fiber,
   said shutter means including a casing surrounding said spaced apart ends of respective first and second optical fibers terminating therein, said casing separating and optically isolating said surrounding optical fiber ends from adjacent shutter means.

2. The optical fiber display device of claim 1 wherein said light input ends of said first optical fibers are grouped together in parallelism in a bundle, and a single source of light is used to illuminate said bundled ends.

3. The optical fiber display device of claim 1 wherein each of said pixels comprises a light diffusing lens, said lenses being arranged on said display face in a display matrix.

4. The optical fiber display device of claim 3 wherein each said diffusion lens has a circular shaped base through which light enters said lens from said base having a diameter greater than the diameter of said second optical fiber, each said light conductor further including light beam matching means for interconnecting said one end of said second optical fiber with said diffusion lens base, said light beam matching means adapted to permit the expansion of the beam width of light exiting from said second optical fiber to approximately the size of said base width from improved transfer of light between said second optical fiber and said lens.

5. The optical fiber display device of claim 4 wherein said light beam matching means comprises a light conducting rod, said rod having a longitudinal length which is sufficient to permit the light beam exiting from said second optical fiber to expand within said matching rod to approximately match said base width of said lens.

* * * * *